United States Patent
Somani et al.

(10) Patent No.: US 11,226,956 B2
(45) Date of Patent: Jan. 18, 2022

(54) SYSTEM, METHOD, AND APPARATUS FOR IMPLEMENTING A BLOCKCHAIN-BASED ENTITY IDENTIFICATION NETWORK

(71) Applicant: Visa International Service Association, San Francisco, CA (US)

(72) Inventors: Anil Somani, San Jose, CA (US); Mohamed Nosseir, Castro Valley, CA (US)

(73) Assignee: Visa International Service Association, San Francisco, CA (US)

( * ) Notice: Subject to any disclaimer, the term of this patent is extended or adjusted under 35 U.S.C. 154(b) by 1 day.

(21) Appl. No.: 16/629,098

(22) PCT Filed: Jul. 7, 2017

(86) PCT No.: PCT/US2017/041002
§ 371 (c)(1),
(2) Date: Jan. 7, 2020

(87) PCT Pub. No.: WO2019/009914
PCT Pub. Date: Jan. 10, 2019

(65) Prior Publication Data
US 2020/0167336 A1    May 28, 2020

(51) Int. Cl.
*G06F 16/23* (2019.01)
*G06F 16/2457* (2019.01)
(Continued)

(52) U.S. Cl.
CPC .... *G06F 16/2365* (2019.01); *G06F 16/24575* (2019.01); *G06F 21/6218* (2013.01); *G06Q 40/02* (2013.01)

(58) Field of Classification Search
CPC ........... G06F 16/2365; G06F 16/24575; G06F 21/6218; G06Q 40/02; G06Q 20/223;
(Continued)

(56) References Cited

U.S. PATENT DOCUMENTS

| 9,405,929 B1 | 8/2016 | Van Rotterdam et al. |
| 2013/0159084 A1 | 6/2013 | Smith et al. |

(Continued)

FOREIGN PATENT DOCUMENTS

| WO | 2017066002 A1 | 4/2017 |
| WO | 2017112664 A1 | 6/2017 |

OTHER PUBLICATIONS

Blockchain (database)—Wikipedia, Dec. 21, 2015, 5 pages, https://en.wikipedia.org/w/i ndex.php?title=Blockchain_(database)Soldid=696261810.

(Continued)

*Primary Examiner* — Jorge A Casanova
(74) *Attorney, Agent, or Firm* — The Webb Law Firm (57) ABSTRACT

Provided is a computer-implemented method for implementing a blockchain-based entity identification network. The method includes establishing a blockchain network including a plurality of nodes, the plurality of nodes including a plurality of client nodes and a plurality of entity nodes, maintaining a distributed ledger on a plurality of administrative nodes of the blockchain network, receiving, from at least one node of the plurality of nodes, entity data and at least one entity identifier, the entity data corresponding to the at least one entity identifier, publishing the entity data to the distributed ledger, querying the distributed ledger based on at least one entity identifier received from a client node, and determining, based on the distributed ledger, entity data corresponding to the at least one entity identifier received from the client node.

19 Claims, 5 Drawing Sheets

(51) Int. Cl.
*G06F 21/62* (2013.01)
*G06Q 40/02* (2012.01)

(58) Field of Classification Search
CPC ........... G06Q 20/3829; G06Q 20/4014; G06Q 20/38; G06Q 20/40
See application file for complete search history.

(56) References Cited

U.S. PATENT DOCUMENTS

| | | |
|---|---|---|
| 2015/0170112 A1 | 6/2015 | DeCastro |
| 2015/0363768 A1 | 7/2015 | Melika |
| 2015/0294308 A1 | 10/2015 | Pauker et al. |
| 2016/0342989 A1 | 11/2016 | Davis |
| 2016/0342994 A1 | 11/2016 | Davis |
| 2017/0017958 A1 | 1/2017 | Scott |
| 2017/0091766 A1 | 3/2017 | Venugopalan |
| 2017/0140375 A1 | 5/2017 | Kunstel |
| 2017/0178128 A1 | 6/2017 | Fourez |
| 2018/0285879 A1* | 10/2018 | Gadnis ................ G06F 16/1805 |

OTHER PUBLICATIONS

Buterin, "On Public and Private Blockchains", Aug. 6, 2016, pp. 1-6, https://blog.ethereum.org/2015/08/07/on-public-and-private-blockchains/.

"Distributed Ledger Technology & Cybersecurity—Improving information security in the financial sector", Jan. 25, 2017, 36 pages, https://www.enisa.europa.eu/publications/blockchain-security/at_download/full Report.

Hoefler et al., "Credit card metadata database", Open Data Stack Exchange, Mar. 17, 2017, 3 pages, https://web.archive.org/web/20170317041521/https://opendata.stackexchange.com/questions/3930/credit-card-metadata-database.

* cited by examiner

SYSTEM, METHOD, AND APPARATUS FOR IMPLEMENTING A BLOCKCHAIN-BASED ENTITY IDENTIFICATION NETWORK

CROSS-REFERENCE TO RELATED APPLICATION

This application is the United States national phase of International Application No. PCT/US2017/041002 filed Jul. 7, 2017, the disclosure of which is hereby incorporate by reference in its entirety.

BACKGROUND

1. Technical Field

This disclosure relates generally to blockchain networks and, in some non-limiting embodiments or aspects, to a system, method, and apparatus for implementing a blockchain-based entity identification network.

2. Technical Considerations

Entities that provide portable financial devices to users, such as issuer institutions, are identified by unique identifiers to distinguish those entities from other entities providing similar services. For example, issuer institutions are identified by one or more Bank Identification Numbers (BINs). The BINs allow for merchants, transaction service providers, and other parties to identify an issuer institution that corresponds to a given portable financial device that is used to conduct a transaction.

A common problem facing merchants, transaction service providers, and other parties involved in managing financial transactions is identifying information about an issuer institution corresponding to a portable financial device presented to the merchant by a user. Existing solutions to this problem involve the use of a third-party service that aggregates issuer institution information and offers subscriptions to merchants, transaction service providers, and other parties to provide this information. These third-party subscription services provide feeds of issuer institution information at intervals to subscribers. The merchant or transaction service provider may then store this issuer identification information for use until the next update is provided. Another solution involves the use of a third-party service that offers an online interface for querying issuer institution information. These existing solutions can lead to merchants and/or transaction service providers using incorrect issuer identification information for processing a transaction because the issuer identification information is not updated. Existing technological infrastructures for providing issuer identification information does not allow for issuer identification information to be collected and managed in a timely and consistent manner.

Accordingly, there is a need for a technically improved architecture of an entity identification network to provide updated entity identification information.

SUMMARY

Accordingly, it is an object of the present disclosure to provide improved systems, methods, and apparatus for implementing a blockchain-based entity identification network.

According to some non-limiting embodiments or aspects, provided is a computer-implemented method for implementing a blockchain-based entity identification network comprising a plurality of nodes, the method comprising: establishing, with at least one processor, a blockchain network comprising the plurality of nodes, the plurality of nodes comprising a plurality of client nodes and a plurality of entity nodes; maintaining, with at least one processor, a distributed ledger on a plurality of administrative nodes of the blockchain network, the plurality of administrative nodes comprising at least one of the following nodes from the plurality of nodes: a client node of the plurality of client nodes, an entity node from the plurality of entity nodes, a service provider node, or any combination thereof; receiving, from at least one node of the plurality of nodes, entity data and at least one entity identifier, the entity data corresponding to the at least one entity identifier; publishing, with at least one processor, the entity data to the distributed ledger; querying, with at least one processor, the distributed ledger based on at least one entity identifier received from a client node; and determining, with at least one processor and based on the distributed ledger, entity data corresponding to the at least one entity identifier received from the client node.

In some non-limiting embodiments or aspects, the at least one entity identifier comprises at least one Bank Identification Number (BIN), and wherein the entity data corresponds to at least one issuer institution. Moreover, in some some non-limiting embodiments or aspects, the at least one entity identifier comprises a range of entity identifiers associated with an entity. In some non-limiting embodiments or aspects, the plurality of nodes comprises at least one service provider node, and wherein the at least one service provider node is operated and/or controlled by at least one transaction service provider.

In some non-limiting embodiments or aspects, the method may further include modifying the distributed ledger in response to receiving a request from the at least one service provider node, wherein modifying the distributed ledger comprises at least one of the following: associating entity data with at least one entity identifier, disassociating entity data with at least one entity identifier, or any combination thereof. In some some non-limiting embodiments or aspects, the method may further include modifying the distributed ledger in response to receiving a request from an entity node corresponding to an entity, wherein modifying the distributed ledger comprises at least one of the following: associating at least one entity identifier with a different entity, disassociating at least one entity identifier with a different entity, or any combination thereof. The method, in some non-limiting embodiments or aspects, may also include maintaining separate permissions for the at least one service provider node, the plurality of client nodes, and the entity nodes, the separate permissions comprising a plurality of rules governing access to the distributed ledger.

According to some non-limiting embodiments or aspects, provided is a computer program product for implementing a blockchain-based entity identification network, comprising at least one computer-readable medium including program instructions that, when executed by at least one processor, cause the at least one processor to: establish a blockchain network comprising a plurality of nodes, the plurality of nodes comprising a plurality of client nodes and a plurality of entity nodes; maintain a distributed ledger on a plurality of administrative nodes of the blockchain network, the plurality of administrative nodes comprising at least one of the following nodes from the plurality of nodes: a client node of the plurality of client nodes, an entity node from the plurality of entity nodes, a service provider node, or any combination thereof; receive, from at least one node of the plurality of nodes, entity data and at least one entity identifier, the entity data corresponding to the at least one entity identifier; publish the entity data to the distributed ledger; query the distributed ledger based on at least one entity identifier received from a client node; and determine, based on the distributed ledger, entity data corresponding to the at least one entity identifier received from the client node.

In some non-limiting embodiments or aspects, the at least one entity identifier comprises at least one Bank Identification Number (BIN), and wherein the entity data corresponds to at least one issuer institution. Moreover, in some some non-limiting embodiments or aspects, the at least one entity identifier comprises a range of entity identifiers associated with an entity. In some non-limiting embodiments or aspects, the plurality of nodes comprises at least one service provider node, and wherein the at least one service provider node is operated and/or controlled by at least one transaction service provider.

In some non-limiting embodiments or aspects, the program instructions, when executed by the at least one processor, further cause the at least one processor to modify the distributed ledger in response to receiving a request from the at least one service provider node, wherein modifying the distributed ledger comprises at least one of the following: associating entity data with at least one entity identifier, disassociating entity data with at least one entity identifier, or any combination thereof. In some non-limiting embodiments or aspects, the program instructions, when executed by the at least one processor, further cause the at least one processor to modify the distributed ledger in response to receiving a request from an entity node corresponding to an entity, wherein modifying the distributed ledger comprises at least one of the following: associating at least one entity identifier with a different entity, disassociating at least one entity identifier with a different entity, or any combination thereof. In some non-limiting embodiments or aspects, the program instructions, when executed by the at least one processor, further cause the at least one processor to maintain separate permissions for the at least one service provider node, the plurality of client nodes, and the entity nodes, the separate permissions comprising a plurality of rules governing access to the distributed ledger.

According to some non-limiting embodiments or aspects, provided is a blockchain-based entity identification network, comprising: (a) a plurality of administrative nodes, each administrative node of the plurality of administrative nodes programmed or configured to host a distributed ledger; (b) a plurality of entity nodes, each entity node of the plurality of entity nodes programmed or configured to create, modify, and/or delete entity data published to the distributed ledger hosted by the plurality of administrative nodes, the entity data corresponding to the at least one entity identifier; and (c) a plurality of client nodes, each client node of the plurality of client nodes programmed or configured to: (i) query the distributed ledger based on at least one queried entity identifier, and (ii) receive entity data corresponding to the at least one queried entity identifier in response to the query.

In some non-limiting embodiments or aspects, each entity node of the plurality of entity nodes corresponds to an issuer system, and the entity data corresponds to at least one issuer institution associated with the issuer system. In some non-limiting embodiments or aspects, the at least one entity identifier comprises at least one Bank Identification Number (BIN). In some non-limiting embodiments or aspects, at least one of an administrative node of the plurality of administrative nodes, an entity node of the plurality of entity nodes, or a client node of the plurality of client nodes is programmed or configured to query the distributed ledger based on the at least one entity identifier. In some non-limiting embodiments or aspects, only the plurality of administrative nodes has permission to assign entity identifiers to entities.

Further preferred and non-limiting embodiments or aspects are set forth in the following numbered clauses.

Clause 1: A computer-implemented method for implementing a blockchain-based entity identification network comprising a plurality of nodes, the method comprising: establishing, with at least one processor, a blockchain network comprising the plurality of nodes, the plurality of nodes comprising a plurality of client nodes and a plurality of entity nodes; maintaining, with at least one processor, a distributed ledger on a plurality of administrative nodes of the blockchain network, the plurality of administrative nodes comprising at least one of the following nodes from the plurality of nodes: a client node of the plurality of client nodes, an entity node from the plurality of entity nodes, a service provider node, or any combination thereof; receiving, from at least one node of the plurality of nodes, entity data and at least one entity identifier, the entity data corresponding to the at least one entity identifier; publishing, with at least one processor, the entity data to the distributed ledger; querying, with at least one processor, the distributed ledger based on at least one entity identifier received from a client node; and determining, with at least one processor and based on the distributed ledger, entity data corresponding to the at least one entity identifier received from the client node.

Clause 2: The computer-implemented method of clause 1, wherein the at least one entity identifier comprises at least one Bank Identification Number (BIN), and wherein the entity data corresponds to at least one issuer institution.

Clause 3: The computer-implemented method of any of clauses 1-2, wherein the at least one entity identifier comprises a range of entity identifiers associated with an entity.

Clause 4: The computer-implemented method of any of clauses 1-3, wherein the plurality of nodes comprises at least one service provider node, and wherein the at least one service provider node is operated and/or controlled by at least one transaction service provider.

Clause 5: The computer-implemented method of any of clauses 1-4, further comprising modifying the distributed ledger in response to receiving a request from the at least one service provider node, wherein modifying the distributed ledger comprises at least one of the following: associating entity data with at least one entity identifier, disassociating entity data with at least one entity identifier, or any combination thereof.

Clause 6: The computer-implemented method of any of clauses 1-5, further comprising modifying the distributed ledger in response to receiving a request from an entity node corresponding to an entity, wherein modifying the distributed ledger comprises at least one of the following: associating at least one entity identifier with a different entity, disassociating at least one entity identifier with a different entity, or any combination thereof.

Clause 7: The computer-implemented method of any of clauses 1-6, further comprising maintaining separate permissions for the at least one service provider node, the plurality of client nodes, and the entity nodes, the separate permissions comprising a plurality of rules governing access to the distributed ledger.

Clause 8: A computer program product for implementing a blockchain-based entity identification network, comprising at least one computer-readable medium including program instructions that, when executed by at least one processor, cause the at least one processor to: establish a blockchain network comprising a plurality of nodes, the plurality of nodes comprising a plurality of client nodes and a plurality of entity nodes; maintain a distributed ledger on a plurality of administrative nodes of the blockchain network, the plurality of administrative nodes comprising at least one of the following nodes from the plurality of nodes: a client node of the plurality of client nodes, an entity node from the plurality of entity nodes, a service provider node, or any combination thereof; receive, from at least one node of the plurality of nodes, entity data and at least one entity identifier, the entity data corresponding to the at least one entity identifier; publish the entity data to the distributed ledger; query the distributed ledger based on at least one entity identifier received from a client node; and determine, based on the distributed ledger, entity data corresponding to the at least one entity identifier received from the client node.

Clause 9: The computer program product of clause 8, wherein the at least one entity identifier comprises at least one Bank Identification Number (BIN), and wherein the entity data corresponds to at least one issuer institution.

Clause 10: The computer program product of any of clauses 8-9, wherein the at least one entity identifier comprises a range of entity identifiers associated with an entity.

Clause 11: The computer program product of any of clauses 8-10, wherein the plurality of nodes comprises at least one service provider node, and wherein the at least one service provider node is operated and/or controlled by at least one transaction service provider.

Clause 12: The computer program product of any of clauses 8-11, wherein the program instructions, when executed by the at least one processor, further cause the at least one processor to modify the distributed ledger in response to receiving a request from the at least one service provider node, wherein modifying the distributed ledger comprises at least one of the following: associating entity data with at least one entity identifier, disassociating entity data with at least one entity identifier, or any combination thereof.

Clause 13: The computer program product of any of clauses 8-12, wherein the program instructions, when executed by the at least one processor, further cause the at least one processor to modify the distributed ledger in response to receiving a request from an entity node corresponding to an entity, wherein modifying the distributed ledger comprises at least one of the following: associating at least one entity identifier with a different entity, disassociating at least one entity identifier with a different entity, or any combination thereof.

Clause 14: The computer program product of any of clauses 8-13, wherein the program instructions, when executed by the at least one processor, further cause the at least one processor to maintain separate permissions for the at least one service provider node, the plurality of client nodes, and the entity nodes, the separate permissions comprising a plurality of rules governing access to the distributed ledger.

Clause 15: A blockchain-based entity identification network, comprising: (a) a plurality of administrative nodes, each administrative node of the plurality of administrative nodes programmed or configured to host a distributed ledger; (b) a plurality of entity nodes, each entity node of the plurality of entity nodes programmed or configured to create, modify, and/or delete entity data published to the distributed ledger hosted by the plurality of administrative nodes, the entity data corresponding to the at least one entity identifier; and (c) a plurality of client nodes, each client node of the plurality of client nodes programmed or configured to: (i) query the distributed ledger based on at least one queried entity identifier, and (ii) receive entity data corresponding to the at least one queried entity identifier in response to the query.

Clause 16: The blockchain-based entity identification network of clause 15, wherein each entity node of the plurality of entity nodes corresponds to an issuer system, and wherein the entity data corresponds to at least one issuer institution associated with the issuer system.

Clause 17: The blockchain-based entity identification network of any of clauses 15-16, wherein the at least one entity identifier comprises at least one Bank Identification Number (BIN).

Clause 18: The blockchain-based entity identification network of any of clauses 15-17, wherein at least one of an administrative node of the plurality of administrative nodes, an entity node of the plurality of entity nodes, or a client node of the plurality of client nodes is programmed or configured to query the distributed ledger based on the at least one entity identifier.

Clause 19: The blockchain-based entity identification network of any of clauses 15-18, wherein only the plurality of administrative nodes has permission to assign entity identifiers to entities.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figures, in which.

DESCRIPTION OF THE PREFERRED EMBODIMENTS

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

Non-limiting embodiments of the present disclosure are directed to a system, method, and computer program product for implementing a blockchain-based entity identification network that allows devices and users in the network to accurately and consistently determine entity data such as which entities are associated with which entity identifiers. For example, the present disclosure may be used to accurately and consistently determine which issuer institutions are associated with one or more Bank Identification Numbers (BINs). By leveraging blockchain technology and utilizing a unique network architecture, non-limiting embodiments improve upon existing systems and methods for identifying entities, such as issuer institutions, based on one or more identifiers. Through the use of a permission-based blockchain, different participants in the network may have different abilities based on specified permissions, improving the integrity of the entity data. Moreover, the use of a distributed ledger provides quick access to reliable information for processing a transaction. By utilizing blockchain technologies and by maintaining permissions for different participants in the blockchain network, a technologically improved network architecture is provided that allows for transparency, consistency, and ease of use by all participants.

Using non-limiting embodiments of the systems and methods described herein, merchant systems presented with a portable financial device by a user may determine what country the issuer institution is located that issued the portable financial device. Merchant systems may also want to determine if the issuer institution is a preapproved issuer institution that is accepted by the merchant. Additionally, merchants, clients, and other entities may need to determine information associated with an issuer institution that issued a portable financial device for other reasons. As an example, an electronic wallet provider or merchant system may use non-limiting embodiments of the system described herein to determine what type of portable financial device a user adds to an electronic wallet or account. As an additional example, an electronic wallet provider may want to identify the issuer institution and even a specific type of portable financial device to provide an image (e.g., a logo, a picture of that type of portable financial device, etc.) in an electronic wallet application or elsewhere.

Because data maintained in the blockchain network is available to all participants of the blockchain having permission to access the data, users having the appropriate permission(s) can obtain entity data for any BIN or BIN range. The transparency of a blockchain network prevents inconsistency and fraudulent activity among the participants. Moreover, since a single blockchain may store entity data for multiple entities, merchant systems and electronic wallet providers can easily use such entity data, provide such entity data to consumers, and integrate such entity data into merchant systems and/or electronic wallet applications.

As used herein, the term "transaction service provider" may refer to an entity that receives transaction authorization requests from merchants or other entities and provides guarantees of payment, in some cases through an agreement between the transaction service provider and an issuer institution. The term "transaction service provider" may also refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "issuer institution" may refer to one or more entities, such as a bank, that provide accounts to customers for conducting payment transactions, such as initiating credit and/or debit payments. For example, an issuer institution may provide an account identifier, such as a personal account number (PAN), to a customer that uniquely identifies one or more accounts associated with that customer. The account identifier may be embodied on a physical financial instrument, such as a payment card, and/or may be electronic and used for electronic payments. The terms "issuer institution," "issuer bank," and "issuer system" may also refer to one or more computer systems operated by or on behalf of an issuer institution, such as a server computer executing one or more software applications. For example, an issuer system may include one or more authorization servers for authorizing a payment transaction.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they can be used to conduct a transaction without directly using the original account identifier. In some examples, an original account identifier, such as a PAN, may be associated with a plurality of tokens for different individuals or purposes. An issuer institution may be associated with a BIN or other unique identifier that uniquely identifies it among other issuer institutions.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Wallet™, Android Pay™, Apple Pay®, Samsung Pay®, and/or other like electronic payment systems. In some non-limiting examples, an issuer bank may be an electronic wallet provider.

As used herein, the term "portable financial device" may refer to a payment device, an electronic payment device, a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a mobile device executing an electronic wallet application, a personal digital assistant, a security card, an access card, a wireless terminal, and/or a transponder, as examples. The portable financial device may include a volatile or a non-volatile memory to store information, such as an account identifier or a name of the account holder.

Figure 1:
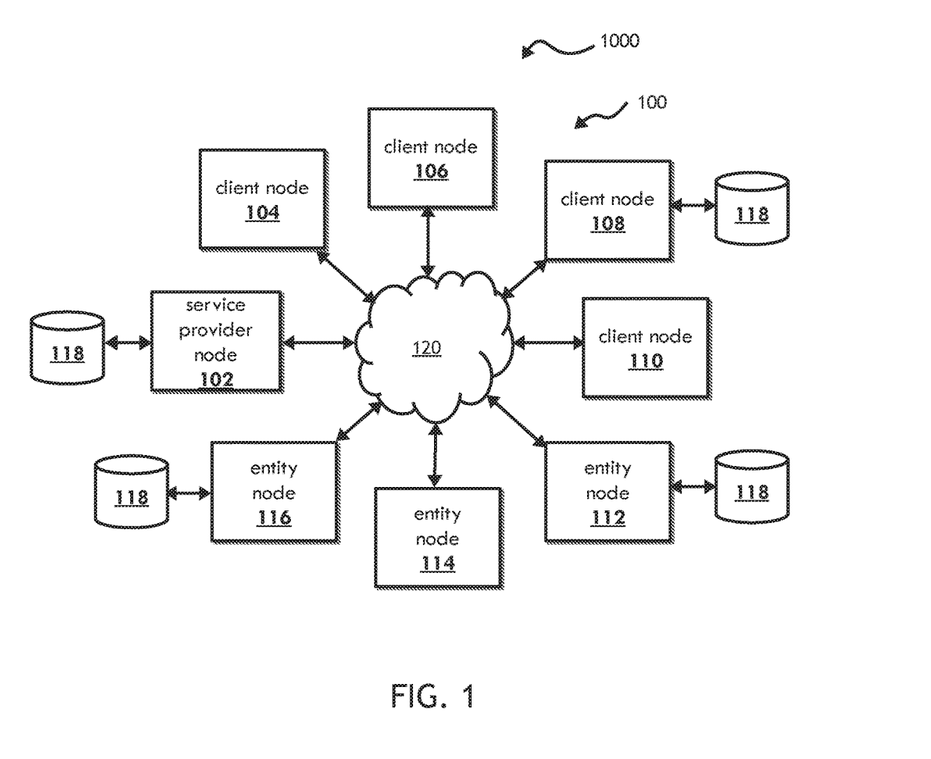
FIG. 1 is a schematic diagram of a system for implementing a blockchain-based entity identification network according to some non-limiting embodiments or aspects.

Referring now to FIG. 1, a schematic diagram of a system 1000 for implementing a blockchain-based entity identification network is shown according to some non-limiting embodiments or aspects. The system 1000 includes a blockchain network 100 having a service provider node 102, client nodes 104, 106, 108, 110, and entity nodes 112, 114, 116. The nodes may be in communication via one or more network environments 120, such as the Internet, a private network, and/or the like. It will be appreciated that various numbers of service provider nodes, client nodes, and entity nodes may be included in the blockchain network 100 of the system 1000, and that the blockchain network 100 may also include nodes of different types. In some non-limiting embodiments or aspects, for example, there may be no service provider nodes included in the blockchain network 100. In FIG. 1, the service provider node 102, entity node 116, entity node 112, and client node 108 host a distributed ledger 118. The distributed ledger 118 may be hosted by any node and any number of nodes in the system 1000.

As used herein, the term "node" refers to one or more computing devices in communication with other computing devices via one or more network environments. Each participant in the blockchain network 100 may be associated with a node. In some examples, only certain nodes and/or types of nodes (e.g., client, entity, service provider, etc.) may host a distributed ledger 118. Nodes that host the distributed ledger 118 may be referred to as "full nodes." An "administrative node" may be a client node, an entity node, a service provider node, a full node, and/or the like that has the ability to assign permissions to different nodes and/or participants in the blockchain network 100. In some non-limiting embodiments or aspects, service provider nodes 102 may serve as administrative nodes. However, it will be appreciated that various arrangements are possible in which any node may serve as a full node and/or administrative node.

With continued reference to FIG. 1, entity nodes 112, 114, 116 may each be associated with an entity such as an issuer institution. For example, the entity nodes 112, 114, 116 may be different issuer systems corresponding respectively to different issuer institutions. However, it will be appreciated that the entity nodes may be systems corresponding to any type of different entities. The service provider node 102 may be a transaction service provider system for a transaction service provider, such as a payment network, but could also be any other system corresponding to a service provider or other type of network participant. The client nodes 104, 106, 108, 110 may be different merchant systems for different merchants, electronic wallet providers, customers, payment gateways, and/or the like. In some embodiments, the client nodes 104, 106, 108, 110 may be systems associated with checkout providers, such as merchants, electronic wallet providers, payment gateways, and the like. One or more client nodes 104, 106, 108, 110 may also include a mobile device associated with a user.

It will be appreciated that, in some non-limiting embodiments or aspects, the types of nodes may overlap. For example, a node may be both a service provider node and an entity node for a transaction service provider that also acts as an issuer institution. In some non-limiting examples, the blockchain network 100 may not include any service provider nodes and may only include entity nodes and client nodes. Moreover, in some non-limiting embodiments or aspects, other types of nodes and users may be included in the blockchain network 100. Various other arrangements are possible.

Still referring to FIG. 1, each node 102, 104, 106, 108, 110, 112, 114, 116 may be associated with one or more unique identifiers, such as an entity identifier, a client identifier, a service provider identifier, an administrative identifier, and the like. An entity identifier may identify an entity and include, for example, one or more BINs or BIN ranges that identify an issuer institution. In such examples, an issuer institution may be associated with the one or more BINs or BIN ranges that uniquely identify it. In some non-limiting embodiments or aspects, a BIN or BIN range may not only uniquely identify an issuer institution, but may also uniquely identify a type of portable financial device or subset of portable financial devices offered by the issuer institution. For example, an issuer institution may be assigned a plurality of BINs, such that different types of portable financial devices (e.g., credit, debit, prepaid, different rewards, different branches of the issuer institution, different credit limits, and/or the like) are associated with specific BINs or BIN ranges from the plurality of BINs assigned to the issuer institution.

In some non-limiting embodiments or aspects, there may be other entity identifiers for an entity, such as an issuer institution, in addition to a BIN, such as a standardized issuer institution name, an identification number, and/or the like. A client identifier may identify a client node and include, for example, a merchant identifier, an electronic wallet provider identifier, a user identifier, and/or the like. It will be appreciated that an entity identifier, a client identifier, a service provider identifier, an administrative identifier, and any other identifiers may be in any form, such as an alphanumeric string, a number, a network address for the node, and/or the like, and that multiple identifiers may be used for each node.

The blockchain network 100 provides a shared, distributed ledger 118 for recording the history of transactions and/or other information, allowing for consistency, accountability, and transparency. The blockchain network 100 allows for transactions to occur and/or for information to be shared among multiple participants. The blockchain network 100 does not require the use of cryptocurrencies, such as a Bitcoin network, but can instead be implemented with a distributed ledger 118 and various participants without requiring any underlying transactions, processor-intensive problem solving, or other aspects of a cryptocurrency-based blockchain network. In some non-limiting embodiments or aspects, the blockchain network 100 may be implemented with a third-party distributed ledger framework such as IBM Hyperledger Fabric. For example, the blockchain network 100 may be implemented using the IBM Bluemix Fabric cloud-based platform. It will be appreciated, however, that the blockchain network described herein may be implemented in any number of ways and using various frameworks and/or network architectures. For example, non-limiting embodiments may be implemented using a cryptocurrency-based blockchain network.

In some non-limiting embodiments or aspects, and still referring to FIG. 1, each node and/or type of node may be assigned permissions defining how that node can interact with the distributed ledger 118. For example, entity node 112 may have permission to publish entity data associated with itself, but may not have permission to publish entity data associated with other entity nodes 114, 116. An entity node 112 may also have permission to assign entity identifiers to other entity nodes 114, 116. For example, if one or more BINs or BIN ranges are already assigned to a particular issuer institution, the entity node corresponding to that issuer institution may have permission to assign the BIN(s) or BIN range(s) to another issuer institution. In some non-limiting embodiments or aspects, the entity node may also have permission to reclaim one or more entity identifiers, such as BINs or BIN ranges, it previously assigned to another issuer institution. As another example, the entity node may also have permission to change an assignment of one or more entity identifiers, such as BINs or BIN ranges, it previously assigned to another issuer institution to yet another issuer institution. Various other permissive functions are possible.

In some non-limiting embodiments or aspects, a service provider node 102 may have permission to publish entity data associated with any of the entity nodes 112, 114, 116, including assigning one or more entity identifiers to entity nodes 112, 114, 116, reclaiming one or more entity identifiers from entity nodes 112, 114, 116, changing an assignment of an entity identifier from one entity to another, modifying or adding other entity data for an entity, modifying permissions for other nodes, and/or the like. As an example, a BIN may be reclaimed or reassigned by a service provider node 102 and/or an entity node 112, 114, 116 because an entity is going out of business, is being acquired, and/or the like. Some BINs may be used to issue tokens.

With continued reference to FIG. 1, in some non-limiting embodiments or aspects, a client node 104, 106, 108, 110 may have permission to query the distributed ledger 118 based on a portable financial device, account identifier, BIN (which may be part of an account identifier), and/or any other parameter. For example, a merchant system (such as, for example, a merchant POS), may query the distributed ledger 118 at the time of a transaction and based on a BIN associated with a portable financial device presented for the transaction in order to identify the issuer institution that issued the portable financial device and/or identify other information associated with that issuer institution. As another example, an electronic wallet provider may query the distributed ledger 118 in response to a user adding a portable financial device to an electronic wallet, where the query is based on a BIN, account identifier, or token, as examples. The query may return any amount or subset of entity data responsive to the query such as, for example, one or more images, a name of an issuer institution, a country or other location of an issuer institution, and/or the like. It will be appreciated that client nodes 104, 106, 108, 110 may be provided with various different permissions for interacting with the distributed ledger 118.

As used herein, "entity data" may refer to any information associated with an entity such as, for example, an issuer institution. Entity data may include, but is not limited to, entity identification data such as one or more entity identifiers, ranges of entity identifiers, an entity name (e.g., issuer institution name), entity address (e.g., issuer institution address, physical and/or electronic), an entity location (e.g., a country, a city, and/or the like), an entity image (e.g., a logo, an image of a credit or debit card, and/or the like), entity URL (e.g., issuer institution URL), entity telephone number (e.g., issuer institution telephone number), entity email (e.g., issuer institution electronic mail address), and/or any other information associated with an entity.

An administrative node may have permission to manage the permissions of other participants in the blockchain network 100. An administrative node may include a service provider node, a client node, an entity node, or any other participant in the blockchain network 100. In some examples, only administrative nodes may have permission to assign one or more BINs or BIN ranges to entity nodes 112, 114, 116 associated with issuer institutions such that those entity nodes 112, 114, 116 can publish entity data corresponding to those issuer institutions.

The distributed ledger 118 of the blockchain network 100 may be queried by any node having permission and based on one or more specified parameters. The query may be generated at the request of a user, at the request of a merchant, at the request of a payment gateway, and/or at the request of an electronic wallet application, as examples. In some non-limiting embodiments or aspects, a merchant POS may query the distributed ledger 118 to determine, at the time of a transaction, whether a customer's portable financial device may be accepted by the merchant. Further, in some non-limiting embodiments or aspects, the ability to query the distributed ledger 118 may be provided to different clients as a subscription-based service.

The query may return, to the client node, one or more parameters of entity data based on the BIN(s) or BIN range(s) identified in the query. In some non-limiting embodiments or aspects, instead of including BIN(s) or BIN range(s) in a query, a query may include one or more other parameters and return one or more BINs or BIN ranges. For example, a client may query the distributed ledger based at least partially on an issuer institution name or location, and may receive one or more BINs or BIN ranges in response to the query. Various other queries are possible.

Figure 2:
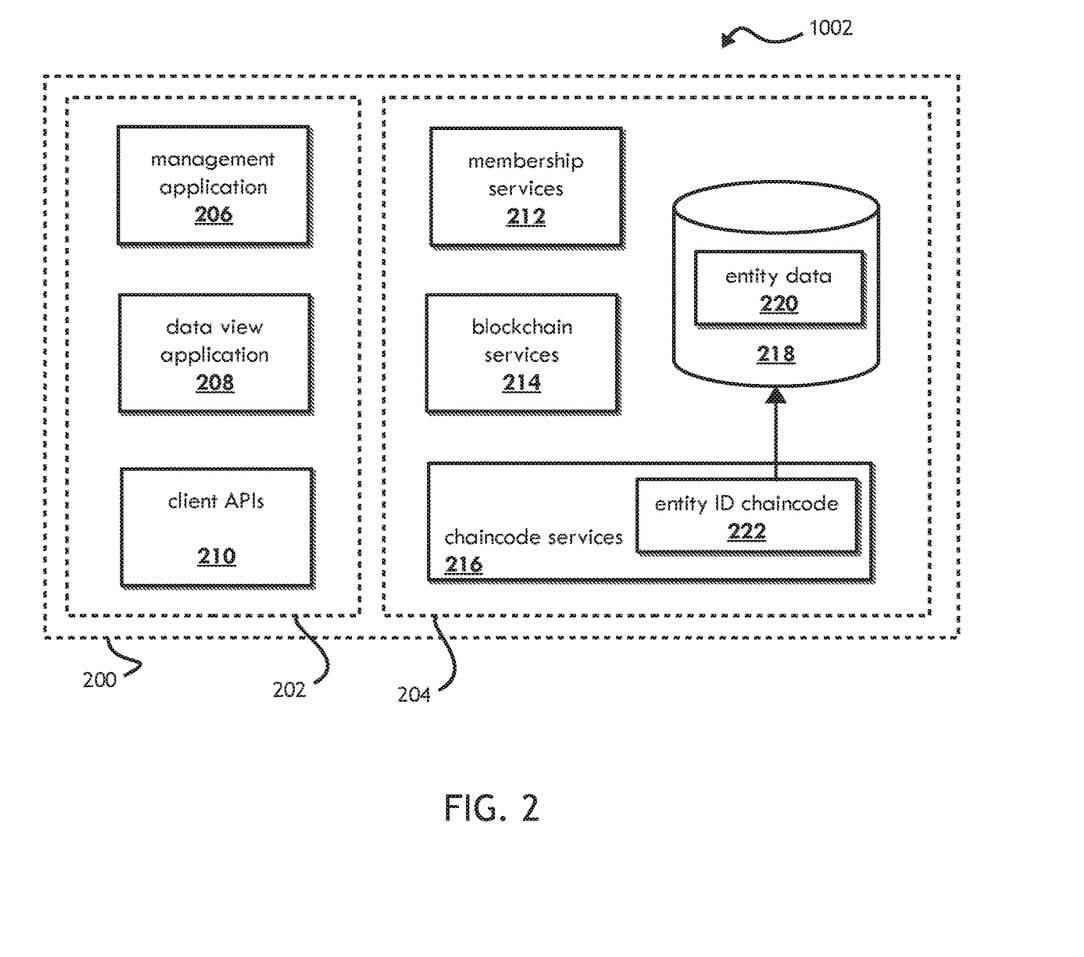
FIG. 2 is a schematic diagram of a system for implementing a blockchain-based entity identification network according to some non-limiting embodiments or aspects.

Referring now to FIG. 2, a schematic diagram is shown for a system 1002 for implementing a blockchain-based entity identification network according to some non-limiting embodiments or aspects. The system 1002 includes a blockchain architecture 200 with client applications 202 and services 204. The client applications 202 may include any processing logic for interacting with a distributed ledger 218. For example, a management application 206 may facilitate administrative nodes and/or service provider nodes to manage permissions, assign BINs or other entity identifiers to entity nodes, and/or the like. A data view application 208 may facilitate client nodes (or any other node having permission) to query the distributed ledger 218 for entity data. Client APIs 210 may facilitate merchants and/or electronic wallet providers to provide applications and systems to interface with the system 1002 and to allow for third-party client applications to query the distributed ledger 218, display the results of the query, and/or to take other permissible actions.

Still referring to FIG. 2, the services 204 may include membership services 212, blockchain services 214, and chaincode services 216. It will be appreciated that the services 204 may differ based on how the blockchain network is implemented. For example, implementations using IBM Hyperledger may utilize chaincode services 216 for accessing the distributed ledger 218. A "chaincode," as used herein, may refer to program code that is deployed among nodes of a blockchain network to enable interaction with the distributed ledger 218. Other distributed ledger frameworks may utilize various other applications and services for interacting and enabling interaction with the distributed ledger 218. Membership services 212 may maintain permissions for different participants in the blockchain network. Blockchain services 214 may manage the distributed ledger, the permissions for different participants in the blockchain network, and provide other services relating to managing and maintaining the blockchain network. The distributed ledger 218 in FIG. 2 includes entity data 220 representing a world state that is mirrored by each of the full nodes maintaining an instance of the distributed ledger 218.

Still referring to FIG. 2, the chaincode services 216 may include an entity identification chaincode 222 for publishing entity data 220 to the distributed ledger 218 and querying entity data 220 from the distributed ledger 218. The client applications 202 perform one or more functions with respect to the distributed ledger 218 through the entity identification chaincode 222. The client applications 202 may be executed by client nodes or any other node in the blockchain network. For example, the entity identification chaincode 222 may allow a client application 202 to read entity data 220 from and/or write entity data 220 to the distributed ledger 218 based on the permissions available to that client node via membership services 212. A client application 202 may therefore create, update, and/or delete entity data associated with one or more entities. A client application 202 may also query the distributed ledger 218 for entity data based on one or more BINs, BIN ranges, and/or any other parameter of entity data stored in the distributed ledger 218.

In some non-limiting embodiments or aspects, one or more smart contracts may be used to provide services and/or manage permissions in the blockchain network. A smart contract may be coded with logic by a user at an administrative node or any other node, where the logic defines one or more rules for interactions and/or abilities of nodes in the blockchain network. The smart contract is then published to the distributed ledger 218. In some non-limiting embodiments or aspects, smart contracts may be used to enable client applications 202 to interact with the distributed ledger 218.

It will be appreciated that the distributed ledger may comprise any type of data model for structuring the entity data stored therein. For example, in some non-limiting embodiments or aspects, various tables or objects may be used to structure entity data. A program table may store entity data, and a user table may store information about users and/or nodes and roles associated with such users and/or nodes, such as permission information. For example, a user or node with an "entity" role (e.g., an issuer institution system) may be enabled to create, update, and/or delete entity data associated with that particular entity, and a user or node with a "client" role (e.g., a merchant system) may be enabled to query the distributed ledger based on BIN(s), BIN range(s), and/or other parameters. It will be appreciated that certain users or nodes may only have permission to create, update, and/or delete entity data for certain entities, such as entities assigned to or associated with that user or node.

Figure 3:
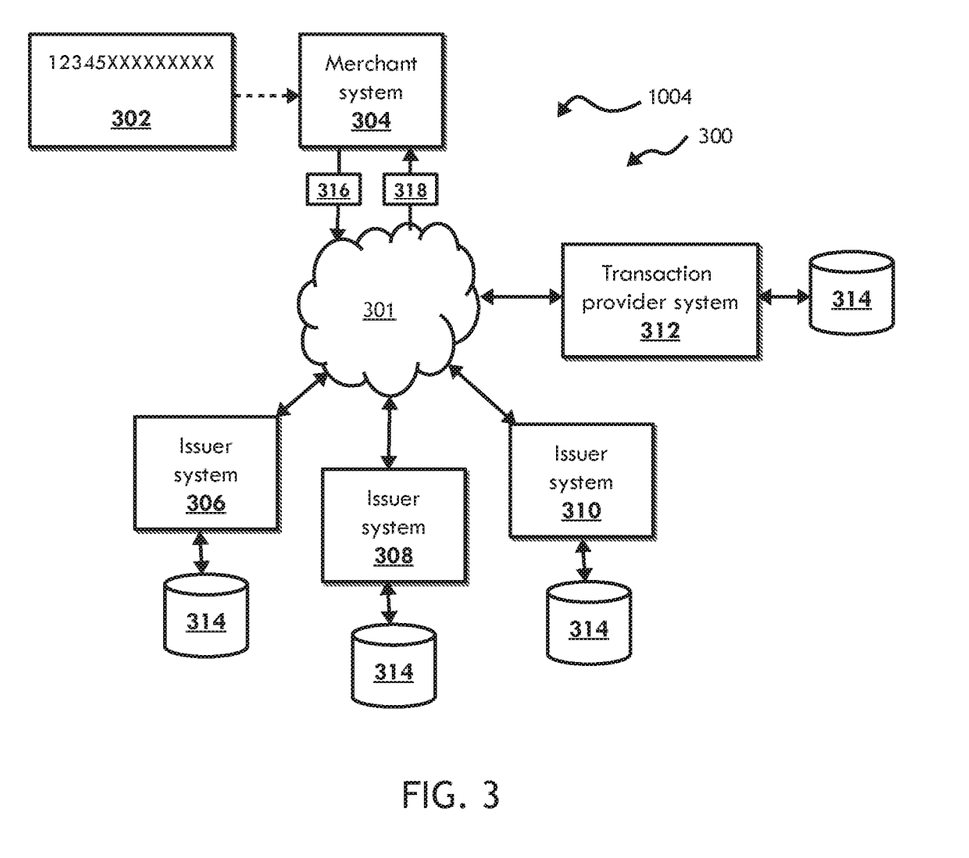
FIG. 3 is a schematic diagram of a system for implementing a blockchain-based entity identification network according to some non-limiting embodiments or aspects.

Referring now to FIG. 3, a schematic diagram of a system 1004 for implementing a blockchain-based entity identification network is shown according to some non-limiting embodiments or aspects. In the depicted example, a merchant system 304 is in communication with a transaction service provider system 312 and issuer systems 306, 308, 310 via a network environment 301. The merchant system 304 in this example serves as a client node, the issuer systems 306, 308, 310 serve as entity nodes, and the transaction service provider system 312 serves as a service provider node and/or administrative node in a blockchain network 300.

With continued reference to FIG. 3, the transaction service provider system 312 may publish entity data to a distributed ledger 314 by, for example, communicating a message to the blockchain network 300 via the network environment 301. The transaction service provider system 312 may, as an example, assign a BIN range of 12340-12345 to an issuer institution associated with issuer system 308. To do so, the transaction service provider system 312 may communicate a message that is receivable by applications executed by at least some nodes (e.g., issuer systems 306, 308, 310) of the blockchain network 300. The message may contain logic to, or may cause logic of an application to, publish entity data to the distributed ledger 314 by updating the distributed ledger 314 to associate the BIN range of 12340-12345 with the issuer institution. The BIN range may replace or be in addition to one or more existing BINs or BIN ranges. As another example, the issuer system 308 my initiate a publication action by communicating a record associating itself with a particular BIN or BIN range to the blockchain network 30 via the network environment 301. In such an example, the transaction service provider system 312 or any administrative node may approve of the issuer system 308 publication request before any entity data provided by that issuer system 308 is published to the distributed ledger 314. In some examples, approval may be received from one or all of the administrative nodes in the blockchain network 300. This functionality utilizes the consensus aspect of blockchain networks.

Still referring to FIG. 3, once the issuer institution associated with issuer system 308 is assigned the BIN range of (e.g., "12345"), the issuer system 308 may have or be granted permission to update any other entity data associated with that BIN range (or any other BIN or BIN range assigned to the issuer institution). For example, the issuer system 308 may communicate a message that is receivable by applications executed by at least some nodes (e.g., issuer systems 306, 308, 310) of the blockchain network 300. The message may contain logic to, or may cause logic of an application to, publish entity data to the distributed ledger 314 by updating the distributed ledger 314 to add or replace entity data, such as an entity name, entity address (physical and/or electronic), entity URL, entity telephone number, an entity electronic mail address, an entity location or country, and/or the like. In some non-limiting embodiments or aspects, the issuer institution may be associated with a profile having various parameters and a profile identifier, and some or all of those parameters may be edited by the issuer institution. The issuer system 308 may also publish entity data corresponding to a specific BIN (e.g., "12345") or BIN range (e.g., "12340-12345"), such as a portable financial device type (e.g., a card type), a portable financial device image, and/or a portable financial device description. Further, as discussed above, in some non-limiting embodiments or aspects, entity data from the issuer system 308 may only be published to the distributed ledger 314 after receiving approval from one or more administrative nodes (e.g., the transaction service provider system 312).

With continued reference to the example shown in FIG. 3, a customer presents a portable financial device 302 having an account identifier ("12345XXXXXXXXXX") to the merchant system 304, such as a merchant POS. The account identifier includes a BIN "12345" that uniquely identifies an issuer institution associated with issuer system 308. The merchant system 304 generates a query message 316 including the BIN ("12345") and transmits the query message 316 to the blockchain network via the network environment 301. The query message 316 may be received by the issuer systems 306, 308, 310 and the transaction service provider system 312, each of which hosts an instance of the distributed ledger 314. An application hosted by one or more of the issuer systems 306, 308, 310 and the transaction service provider system 312 may include logic to authenticate the query message 316 and query the distributed ledger for the BIN "12345" based on the query message 316. In some non-limiting embodiments or aspects, the query message 316 or part of the query message 316 may be stored on the distributed ledger 314 or elsewhere as a log. The application or a third-party system may return, to the merchant system 304, a query response message 318 including entity data associated with BIN "12345." The merchant system 304 may be provided with some or all of the entity data stored in the distributed ledger 314 that is associated with that entity, based at least partially on permissions, the contents of the query message 316, and/or other like factors.

Figure 4:
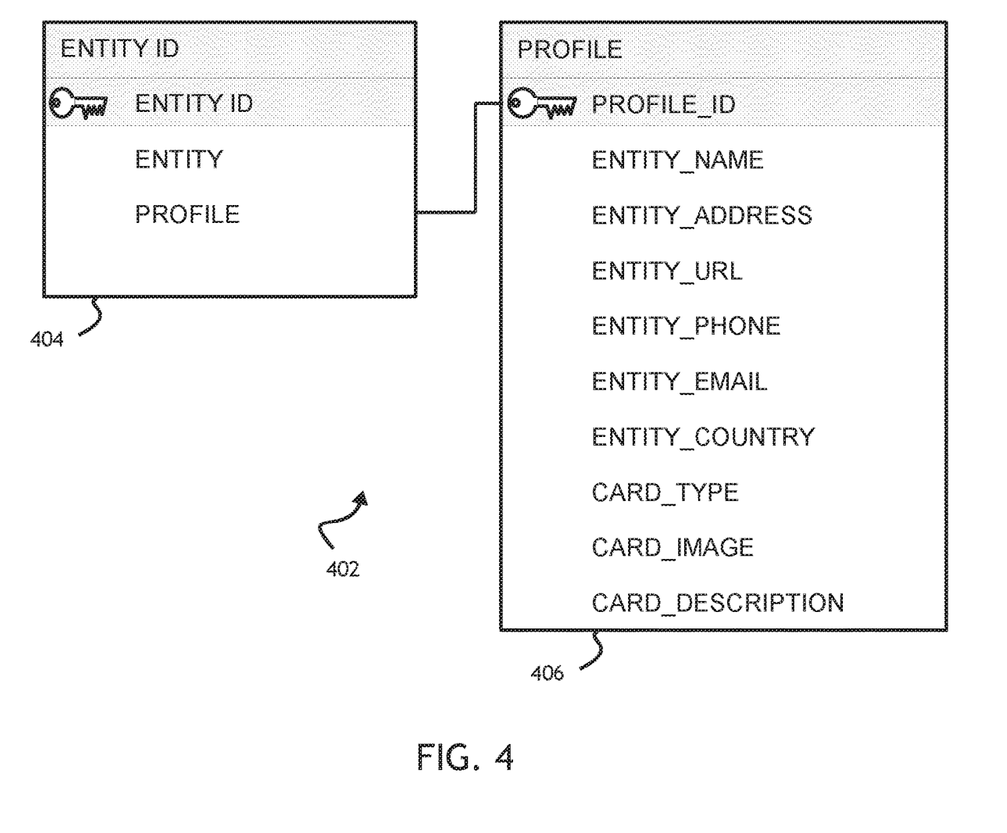
FIG. 4 is a data model for entity data according to some non-limiting embodiments or aspects.

Referring now to FIG. 4, a data model 402 is shown according to some non-limiting embodiments or aspects. The data model includes an entity table 404 and a profile table 406. The entity table 404 includes entity data parameters, such as an entity identifier (e.g., a BIN or BIN range that identifies an issuer institution and at least a subset of portable financial devices offered by that issuer institution), another entity identifier (e.g., such as a single identifier that identifies the issuer institution, which may be associated with multiple BINs), and a profile. The entity identifier parameter shown in FIG. 4 is a protected parameter, meaning that permission is required to create, modify, or delete the values. The profile table 406 includes entity data represented by parameters such as, for example, profile identifier, entity name (e.g., issuer institution name), entity address (e.g., issuer institution address, physical and/or electronic), entity URL (e.g., issuer institution URL), entity telephone number (e.g., issuer institution telephone number), entity email (e.g., issuer institution electronic mail address), an entity country (e.g., country of the issuer institution), a portable financial device type (e.g., a card type), a portable financial device image, and a portable financial device description. It will be appreciated that various other data structures, data models, and parameters may be used.

Figure 5:
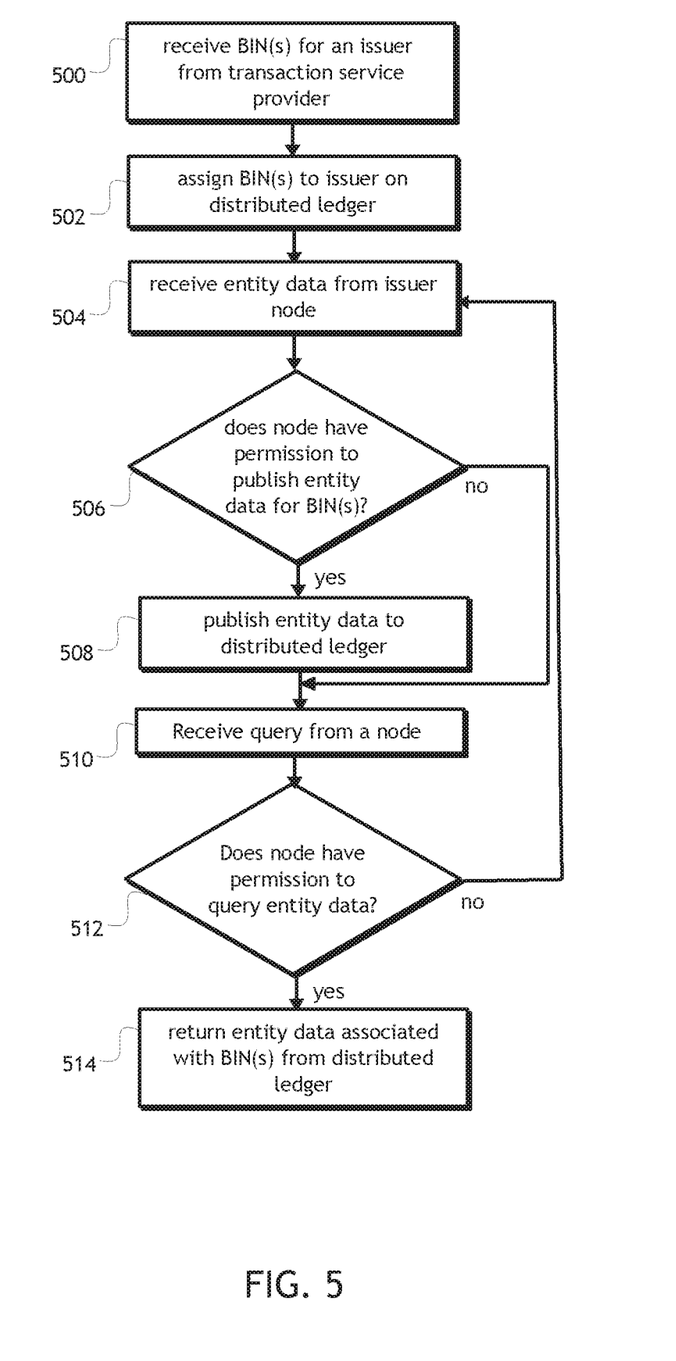
FIG. 5 is a flow diagram of a method for implementing a blockchain-based entity identification network according to some non-limiting embodiments or aspects.

Referring now to FIG. 5, a method for implementing a blockchain-based entity identification network is shown according to some non-limiting embodiments or aspects. The method shown in FIG. 5 starts with an existing blockchain network including a plurality of nodes, at least a subset of which are full nodes hosting an instance of a distributed ledger. Program instructions, such as client applications and/or a distributed ledger framework, are also deployed to the nodes for enabling interaction with the blockchain network. At a first step 500, one or more BINs for an issuer institution are received from a transaction service provider node. At step 502, the one or more BINs are assigned to that issuer institution by publishing the one or more BINs to the distributed ledger such that the one or more BINs are associated with the issuer institution (e.g., associated with another entity identifier that identifies the issuer institution).

With continued reference to FIG. 5, at a next step 504, entity data is received from an issuer node (e.g., an entity node). The entity data may include, for example, a description of one or more portable financial devices associated with the one or more BINs, an image of one or more portable financial devices associated with the one or more BINs, and/or any other data associated with the issuer institution or a portable financial device provided by that issuer institution. At step 506, it is determined whether the issuer node that communicated the entity data has permission to publish that entity data to the distributed ledger. For example, it may be determined if the issuer node is associated with an issuer institution that has been assigned the one or more BINs that are associated with the communicated entity data. If the issuer node is determined to have permission, the method proceeds to step 508 and the entity data is published to the distributed ledger. If the issuer node is determined to not have permission, the method advances to step 510 or returns to step 504 in which new entity data is received or is waiting to be received.

Still referring to FIG. 5, at step 510, a query is received from a node in the blockchain network. For example, the query may include one or more BINs and may be received from a client node such as a merchant system. At step 512, it is determined whether the client node that communicated the query has permission to make that query. If the client node is determined to have permission, the method advances to step 514 and the entity data associated with the one or more BINs is retrieved from the distributed ledger and returned to the client node. If the client node does not have permission to make such a query, the method may return to step 504 in which new entity data is received or is waiting to be received.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A computer-implemented method for implementing a blockchain-based entity identification network comprising a plurality of nodes, the method comprising:
   establishing, with at least one processor, a blockchain network comprising the plurality of nodes, the plurality of nodes comprising a plurality of client nodes and a plurality of entity nodes;
   maintaining, with at least one processor, a distributed ledger on a plurality of administrative nodes of the blockchain network, the plurality of administrative nodes comprising at least one of the following nodes from the plurality of nodes: a client node of the plurality of client nodes, an entity node from the plurality of entity nodes, a service provider node, or any combination thereof;
   maintaining, with at least one processor, separate permissions for at least the plurality of client nodes and the plurality of entity nodes, the separate permissions comprising a plurality of rules governing access to the distributed ledger;
   receiving, from at least one node of the plurality of nodes, entity data and at least one entity identifier, the entity data corresponding to the at least one entity identifier;
   publishing, with at least one processor, the entity data to the distributed ledger;
   querying, with at least one processor, the distributed ledger based on at least one entity identifier received from a client node; and
   determining, with at least one processor and based on the distributed ledger, entity data corresponding to the at least one entity identifier received from the client node.

2. The computer-implemented method of claim 1, wherein the at least one entity identifier comprises at least one Bank Identification Number (BIN), and wherein the entity data corresponds to at least one issuer institution.

3. The computer-implemented method of claim 1, wherein the at least one entity identifier comprises a range of entity identifiers associated with an entity.

4. The computer-implemented method of claim 1, wherein the plurality of nodes comprises at least one service provider node, and wherein the at least one service provider node is operated and/or controlled by at least one transaction service provider.

5. The computer-implemented method of claim 4, further comprising modifying the distributed ledger in response to receiving a request from the at least one service provider node, wherein modifying the distributed ledger comprises at least one of the following: associating entity data with at least one entity identifier, disassociating entity data with at least one entity identifier, or any combination thereof.

6. The computer-implemented method of claim 1, further comprising modifying the distributed ledger in response to receiving a request from an entity node corresponding to an entity, wherein modifying the distributed ledger comprises at least one of the following: associating at least one entity identifier with a different entity, disassociating at least one entity identifier with a different entity, or any combination thereof.

7. The computer-implemented method of claim 1, further comprising maintaining the separate permissions for at least one service provider node, the plurality of client nodes, and the plurality entity of nodes.

8. A computer program product for implementing a blockchain-based entity identification network, comprising at least one non-transitory computer-readable medium including program instructions that, when executed by at least one processor, cause the at least one processor to:
   establish a blockchain network comprising a plurality of nodes, the plurality of nodes comprising a plurality of client nodes and a plurality of entity nodes;
   maintain a distributed ledger on a plurality of administrative nodes of the blockchain network, the plurality of administrative nodes comprising at least one of the following nodes from the plurality of nodes: a client node of the plurality of client nodes, an entity node from the plurality of entity nodes, a service provider node, or any combination thereof;
   maintain separate permissions for at least the plurality of client nodes and the plurality of entity nodes, the separate permissions comprising a plurality of rules governing access to the distributed ledger;
   receive, from at least one node of the plurality of nodes, entity data and at least one entity identifier, the entity data corresponding to the at least one entity identifier;
   publish the entity data to the distributed ledger;
   query the distributed ledger based on at least one entity identifier received from a client node; and
   determine, based on the distributed ledger, entity data corresponding to the at least one entity identifier received from the client node.

9. The computer program product of claim 8, wherein the at least one entity identifier comprises at least one Bank Identification Number (BIN), and wherein the entity data corresponds to at least one issuer institution.

10. The computer program product of claim 8, wherein the at least one entity identifier comprises a range of entity identifiers associated with an entity.

11. The computer program product of claim 8, wherein the plurality of nodes comprises at least one service provider node, and wherein the at least one service provider node is operated and/or controlled by at least one transaction service provider.

12. The computer program product of claim 11, wherein the program instructions, when executed by the at least one processor, further cause the at least one processor to modify the distributed ledger in response to receiving a request from the at least one service provider node, wherein modifying the distributed ledger comprises at least one of the following: associating entity data with at least one entity identifier, disassociating entity data with at least one entity identifier, or any combination thereof.

13. The computer program product of claim 8, wherein the program instructions, when executed by the at least one processor, further cause the at least one processor to modify the distributed ledger in response to receiving a request from an entity node corresponding to an entity, wherein modifying the distributed ledger comprises at least one of the following: associating at least one entity identifier with a different entity, disassociating at least one entity identifier with a different entity, or any combination thereof.

14. The computer program product of claim 8, wherein the program instructions, when executed by the at least one processor, further cause the at least one processor to maintain the separate permissions for at least one service provider node, the plurality of client nodes, and the entity nodes.

15. A blockchain-based entity identification network, comprising:
   (a) a plurality of administrative nodes, each administrative node of the plurality of administrative nodes comprising a computing device programmed or configured to host a distributed ledger;

(b) a plurality of entity nodes, each entity node of the plurality of entity nodes comprising a computing device programmed or configured to create, modify, and/or delete entity data published to the distributed ledger hosted by the plurality of administrative nodes, the entity data corresponding to at least one entity identifier; and (c) a plurality of client nodes, each client node of the plurality of client nodes comprising a computing device programmed or configured to: (i) query the distributed ledger based on at least one queried entity identifier, and (ii) receive entity data corresponding to the at least one queried entity identifier in response to the query, wherein separate permissions are maintained for at least the plurality of client nodes and the plurality of entity nodes, the separate permissions comprising a plurality of rules governing access to the distributed ledger.

16. The blockchain-based entity identification network of claim 15, wherein each entity node of the plurality of entity nodes corresponds to an issuer system, and wherein the entity data corresponds to at least one issuer institution associated with the issuer system.

17. The blockchain-based entity identification network of claim 16, wherein the at least one entity identifier comprises at least one Bank Identification Number (BIN).

18. The blockchain-based entity identification network of claim 15, wherein at least one of an administrative node of the plurality of administrative nodes, an entity node of the plurality of entity nodes, or a client node of the plurality of client nodes is programmed or configured to query the distributed ledger based on the at least one entity identifier.

19. The blockchain-based entity identification network of claim 15, wherein only the plurality of administrative nodes has permission to assign entity identifiers to entities.

* * * * *

UNITED STATES PATENT AND TRADEMARK OFFICE
CERTIFICATE OF CORRECTION

| | |
|---|---|
| PATENT NO. | : 11,226,956 B2 |
| APPLICATION NO. | : 16/629098 |
| DATED | : January 18, 2022 |
| INVENTOR(S) | : Somani et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 47 days.

Signed and Sealed this
Seventh Day of February, 2023

Katherine Kelly Vidal
*Director of the United States Patent and Trademark Office*